United States Patent
Min et al.

(10) Patent No.: US 12,439,463 B2
(45) Date of Patent: Oct. 7, 2025

(54) METHOD, APPARATUS AND SYSTEM FOR MULTI-DEVICE COOPERATION AND MEDIUM

(71) Applicant: JINGDONG TECHNOLOGY INFORMATION TECHNOLOGY CO., LTD., Beijing (CN)

(72) Inventors: Lingji Min, Beijing (CN); Xiujun Yao, Beijing (CN); Chenguang Gui, Beijing (CN); Lihua Cui, Beijing (CN); Chao Deng, Beijing (CN); Qingxiang Zhao, Beijing (CN)

(73) Assignee: JINGDONG TECHNOLOGY INFORMATION TECHNOLOGY CO., LTD., Beijing (CN)

( * ) Notice: Subject to any disclaimer, the term of this patent is extended or adjusted under 35 U.S.C. 154(b) by 356 days.

(21) Appl. No.: 18/246,910

(22) PCT Filed: Sep. 10, 2021

(86) PCT No.: PCT/CN2021/117696
§ 371 (c)(1),
(2) Date: Mar. 28, 2023

(87) PCT Pub. No.: WO2022/068554
PCT Pub. Date: Apr. 7, 2022

(65) Prior Publication Data
US 2023/0371087 A1   Nov. 16, 2023

(30) Foreign Application Priority Data
Sep. 29, 2020   (CN) .......................... 202011051205.4

(51) Int. Cl.
*H04W 76/10* (2018.01)
*H04W 64/00* (2009.01)

(52) U.S. Cl.
CPC .......... *H04W 76/10* (2018.02); *H04W 64/00* (2013.01)

(58) Field of Classification Search
CPC .............................. H04W 76/10; H04W 64/00
See application file for complete search history.

(56) References Cited

U.S. PATENT DOCUMENTS

| 8,406,691 B2 | 3/2013 | Bogestam et al. |
| 2009/0319824 A1 | 12/2009 | Liu et al. |

(Continued)

FOREIGN PATENT DOCUMENTS

| CN | 102790950 A | 11/2012 |
| CN | 103607538 A | 2/2014 |

(Continued)

OTHER PUBLICATIONS

Extended European Search Report issued in counterpart European Patent Application No. 21874215.3, dated Sep. 26, 2024.

(Continued)

*Primary Examiner* — Natasha W Cosme
(74) *Attorney, Agent, or Firm* — Westbridge IP LLC

(57) ABSTRACT

Disclosed are a method, an apparatus and a system for multi-device cooperation and medium. The method for multi-device cooperation is applied to any one of requesting devices, the method including: broadcasting a cooperation request; determining other requesting devices responding to the cooperation request and regarding the other requesting devices responding to the cooperation request as cooperative devices; and establishing a near field wireless communication connection with the cooperative device, and performing data interaction with the cooperative device based on the near field wireless communication.

12 Claims, 8 Drawing Sheets

(56) References Cited

U.S. PATENT DOCUMENTS

| | | | |
|---|---|---|---|
| 2010/0011244 A1* | 1/2010 | Mohamed-Rasheed | H04L 45/04 709/241 |
| 2011/0134840 A1 | 6/2011 | Kim et al. | |
| 2011/0285915 A1 | 11/2011 | Fracchia | |
| 2011/0294527 A1* | 12/2011 | Brueck | H04W 24/02 455/466 |
| 2020/0142770 A1 | 5/2020 | Liu et al. | |

FOREIGN PATENT DOCUMENTS

| | | | |
|---|---|---|---|
| CN | 105491508 A | 4/2016 | |
| CN | 106714115 A | 5/2017 | |
| CN | 107948584 A | 4/2018 | |
| CN | 111418185 A | 7/2020 | |
| CN | 112235733 A | 1/2021 | |
| WO | 2018107389 A1 | 6/2018 | |

OTHER PUBLICATIONS

Watanabe et al., No-Beacon GEDIR: Location-Based Ad-Hoc Routing with Less Communication Overhead, Fourth International Conference on Information Technology: New Generations (ITNG'07), IEEE, pp. 48-55, dated Apr. 1, 2007.

First Office Action issued in counterpart Chinese Patent Application No. 202011051205.4, dated Aug. 13, 2021.

International Search Report and Written Opinion issued in corresponding PCT Application No. PCT/CN2021/117696, dated Nov. 22, 2021.

Second Office Action issued in counterpart Chinese Patent Application No. 202011051205.4, dated Sep. 30, 2021.

Notification to Grant Patent Right for Invention issued in counterpart Chinese Patent Application No. 202011051205.4, dated Apr. 28, 2023.

* cited by examiner

METHOD, APPARATUS AND SYSTEM FOR MULTI-DEVICE COOPERATION AND MEDIUM

CROSS-REFERENCE TO RELATED APPLICATIONS

This application is the National Stage of International Application No. PCT/CN2021/117696, filed on Sep. 10, 2021, which claims priority to Chinese Patent Application No. 202011051205.4, entitled "METHOD, APPARATUS AND SYSTEM FOR MULTI-DEVICE COOPERATION AND MEDIUM" and filed with China National Intellectual Property Administration on Sep. 29, 2020, all contents of which are incorporated herein by reference.

TECHNICAL FIELD

The present disclosure generally relates to the technical field of intelligent interaction, and more particularly to a method, an apparatus and a system for multi-device cooperation and medium.

BACKGROUND

With the increasing labor cost in today's society, and the rapid development of artificial intelligence technology, more and more enterprises use automated guided vehicles instead of high labor costs in warehousing, logistics, manufacturing and other fields. Mobile robots are widely used in various fields because of their advantages of high automation, good reliability, high production efficiency, strong adaptability and low cost.

SUMMARY

In a first aspect, the present disclosure relates to a method for multi-device cooperation, applied to any one of requesting devices, the method for multi-device cooperation including:
broadcasting a cooperation request;
determining other requesting devices responding to the cooperation request and regarding the other requesting devices responding to the cooperation request as cooperative devices; and
establishing a near field wireless communication connection with the cooperative device, and performing data interaction with the cooperative device based on the near field wireless communication.

In some embodiments, the method for multi-device cooperation further includes:
acquiring location information and an identification mark of the cooperative device; and
storing the location information and the identification mark of the cooperative device in a neighbor form correspondingly as neighbor information.

In some embodiments, the method for multi-device cooperation further includes:
sending a unicast packet to a corresponding cooperative device for a preset time interval respectively according to the neighbor information recorded in the neighbor form;
acquiring communication address location information and an identification mark of each cooperative device responding to the unicast packet;
deleting neighbor information corresponding to a cooperative device not responding to the unicast packet from the neighbor form; and
updating corresponding neighbor information in the neighbor form according to the identification mark of the cooperative device responding to the unicast packet.

In some embodiments, each of the requesting devices includes: a central processing unit, a microcontroller and a near field wireless communication device; the central processing unit is connected with the microcontroller through a controller local area network bus; the microcontroller is connected with the near field wireless communication device;
where establishing the near field wireless communication connection with the cooperative device includes:
the near field wireless communication device of the requesting device is wirelessly connected with the near field wireless communication device of the cooperative device.

In some embodiments, performing the data interaction with the cooperative device based on the near field wireless communication includes:
determining, by the central processing unit of the requesting device, neighbor information corresponding to a data acquisition requirement from the neighbor form according to the data acquisition requirement;
generating, by the central processing unit of the requesting device, a data acquisition request according to the data acquisition requirement and sending the data acquisition request to the microcontroller through a subcontracting protocol;
parsing, by the microcontroller, the data acquisition request to obtain a complete data acquisition request, encrypting the data acquisition request and sending the data acquisition request to a near field wireless communication device; and
sending, by the near field wireless communication device, an encrypted data acquisition request to the near field wireless communication device of the cooperative device corresponding to the neighbor information.

In some embodiments, the method for multi-device cooperation further includes:
sending, by the near field wireless communication device, the data to the microcontroller, when the near field wireless communication device receives the data sent by any one of requesting devices; and
sending, by the microcontroller, the data to the central processing unit.

In some embodiments, broadcasting the cooperation request; determining other requesting devices responding to the cooperation request and regarding the other requesting devices responding to the cooperation request as cooperative devices, includes:
broadcasting a broadcast packet including a cooperation request, where the cooperation request includes: location information and identification mark of the requesting device; and
regarding a requesting device sending the feedback data as a cooperative device when feedback data responding to the broadcast packet is received; where the feedback data includes: location information and identification mark of the requesting device, and location information and identification mark of other requesting devices sending the feedback data.

In a second aspect, the present disclosure relates to an apparatus for multi-device cooperation including at least two requesting devices, each of the requesting devices includes:
a first processing unit, configured for broadcasting a cooperation request;
the first processing unit is further configured for determining other requesting devices responding to the cooperation request and regarding the other requesting devices responding to the cooperation request as cooperative devices; and
a connection unit, configured for establishing a near field wireless communication connection with the cooperative device and performing data interaction with the cooperative device based on the near field wireless communication.

In some embodiments, the requesting device further includes:
second processing unit, configured for acquiring the location information and the identification mark of the cooperative device; and storing the location information and the identification mark of the cooperative device in a neighbor form as neighbor information.

In some embodiments, the requesting device further includes:
a third processing unit, configured for sending a unicast packet to a corresponding cooperative device for a preset time interval respectively according to the neighbor information recorded in the neighbor form, sending the unicast packet respectively to the corresponding cooperative device according to the neighbor information recorded in the neighbor form; acquiring communication address location information and an identification mark of each cooperative device responding to the unicast packet; deleting neighbor information corresponding to a cooperative device not responding to the unicast packet from the neighbor form; and updating corresponding neighbor information in the neighbor form according to the identification mark of the cooperative device responding to the unicast packet.

In some embodiments, each of the requesting devices includes: a central processing unit, a microcontroller and a near field wireless communication device; the central processing unit includes: the first processing unit and the second processing unit; the near field wireless communication device includes: the connection unit;
the central processing unit is connected with the microcontroller through a controller local area network bus; the microcontroller is connected with near field wireless communication device; and
the near field wireless communication device of the requesting device is wirelessly connected with the near field wireless communication device of the cooperative device.

In some embodiments, the central processing unit of the requesting device is configured for determining neighbor information corresponding to a data acquisition requirement from the neighbor form according to the data acquisition requirement;
the central processing unit of the requesting device is further configured for generating a data acquisition request according to the data acquisition requirement and sending the data acquisition request to the microcontroller through a subcontracting protocol;
the microcontroller is configured for parsing the data acquisition request to obtain a complete data acquisition request, encrypting the data acquisition request and sending the data acquisition request to a near field wireless communication device; and
the near field wireless communication device is configured for sending an encrypted data acquisition request to the near field wireless communication device of the cooperative device corresponding to the neighbor information.

In some embodiments, the near field wireless communication device is further configured for sending the data to the microcontroller, when the near field wireless communication device receives the data sent by any one of requesting devices; the any one of requesting devices includes: other requesting devices or cooperative devices; and
the microcontroller is further configured for sending the data sent by the near field wireless communication device to the central processing unit.

In some embodiments, the first processing unit is configured for broadcasting a broadcast packet including a cooperation request, where the cooperation request includes: location information and identification mark of the requesting device; and
the first processing unit is configured for regarding a requesting device sending the feedback data as a cooperative device when feedback data responding to the broadcast packet is received; where the feedback data includes: location information and identification mark of the requesting device, and location information and identification mark of other requesting devices sending the feedback data.

In a third aspect, the present disclosure relates to a system for multi-device cooperation, including at least two requesting devices, each of the requesting devices includes a processor, a communication interface, a memory and a communication bus, where the processor, the communication interface and the memory communicate with each other through the communication bus;
the memory is configured for storing computer programs; and
the processor is configured for implementing the method for multi-device cooperation according to the present disclosure when executing the computer program stored on the memory.

In a fourth aspect, the present disclosure relates to a computer-readable storage medium, on which one or more programs are stored, where the one or more programs, when executed by one or more processors, implement the method for multi-device cooperation according to the present disclosure.

In some embodiments of the present disclosure, by broadcasting a cooperation request, so that the cooperation request propagates within the communication range of the requesting device. When other requesting devices receive the cooperation request, the other requesting devices respond according to the cooperation request. At this time, the requesting device regards the device responding to the cooperation request as the cooperative device, and then a near field wireless communication connection with the cooperative device is established to realize data interaction, so that data interaction between devices can be carried out without network.

DETAILED DESCRIPTION OF THE EMBODIMENTS

In order to make the purposes, technical aspects and advantages of the disclosed embodiments clearer, the technical aspects of the disclosed embodiments will be clearly and completely described below in conjunction with the accompanying drawings in the disclosed embodiments, and it will be apparent that the described embodiments are part of, but not all of, the embodiments of the disclosed embodiments. Based on the embodiments in the present disclosure all other embodiments obtained without creative effort by those of ordinary skill in the art fall within the scope of protection of the present disclosure.

Figure 1:
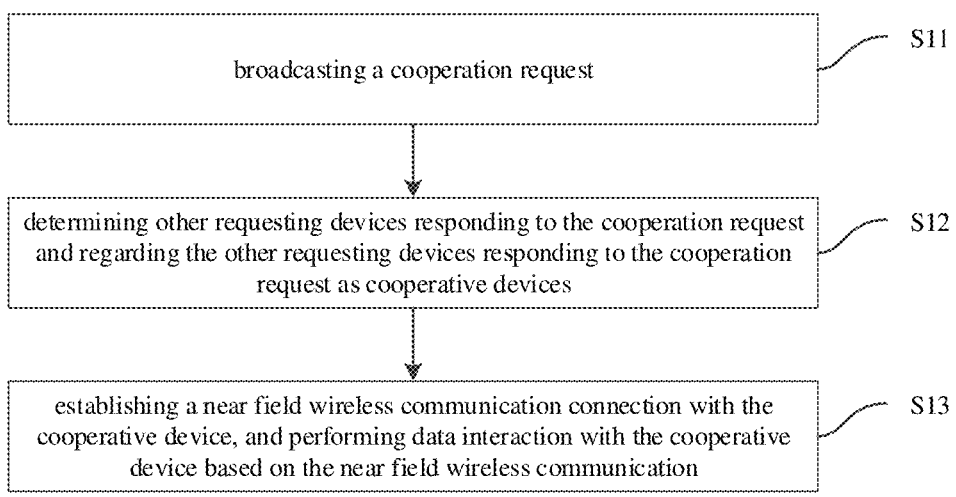
FIG. 1 is a schematic flowchart of a method for multi-device cooperation provided by an embodiment of the present disclosure.

As shown in FIG. 1, an embodiment of the present disclosure provides a method for multi-device cooperation, which is applied to any one of requesting devices. Referring to FIG. 1, the cooperation method includes S11 to S13.

S11, broadcasting a cooperation request.

In some implementations, broadcasting is a "one-to-all" communication mode between hosts. A network unconditionally copies and forwards the signals sent by each host, and all hosts can receive all the information (whether you need it or not). Because it does not need path selection, its network cost can be very low. Cable TV network is a typical broadcast network. Our TV set actually receives signals from all channels., but only restores the signal of one channel to a picture. In underwater acoustic communication network, due to the uncertainty of the location of propagation nodes, underwater acoustic communication network often uses broadcasting to send data packets out undirectionally, and to broadcast data between nodes in turn to realize data transmission.

In some embodiments, the requesting device may be any device that interacts data with a server over a wireless network, and in some embodiments, the requesting device in this step may be an operational robot in a factory.

In some embodiments, a cooperation request is created and broadcast so that the cooperation request is propagated over the communication range of the requesting device, and the device within the communication range can receive the cooperation request.

S12, other requesting devices responding to the cooperation request are determined, and the other requesting devices responding to the cooperation request are regarded as the cooperative devices.

In some embodiments, whether there is a requesting device responding to a cooperation request may be determined based on whether other requesting devices which received the cooperation request feedback information, e.g. an ACK acknowledgement character can be regarded as the feedback information in response to the cooperation request and also feedback information can be determined in accordance with predefined information. ACK, i.e., acknowledge character, is a kind of transmission control character sent by a receiving station to a sending station in data communication. It indicates that the data which is sent has been confirmed to be received correctly.

In some embodiments, in order to facilitate the connection between the requesting device and the cooperative device, the cooperative device may send its own location information and identification information to the requesting device when responding to the cooperation request.

In some embodiments, for example, data packets containing cooperation requests are broadcast through the application layer to actively snoop the peripheral devices, where sending and receiving data can be performed asynchronously to avoid the main session blocking. Device No. 1 sends: 7E 12 FF FF XX XX * 7F, where FF FF is the broadcast address; Device No. 2 receives 7E 12 BB AA XX XX * 7F, where BB AA is the short address of Device No. 1. After the data is parsed, Device No. 2 sends 7E 12 BB AA XX XX * 7F, where BB AA is the short address of Device No. 1; Device No. 1 receives: 7E 12 BC AA XX XX * 7F, where BC AA is the short address of Device No. 2. After the data is parsed, Device No. 2 is regarded as a cooperative device.

S13, establishing a near field near field wireless communication connection with the cooperative device, and performing data interaction with the cooperative device based on the near field wireless communication.

In some embodiments, near field wireless communication connection with the cooperative device is established. Direct data interaction between the requesting device and the cooperative device is realized based on a local connection between the requesting device and the cooperative device, and reliable data exchange and cooperation are realized without a network.

In some embodiments, the near field wireless communication connection may be based on a local connection implemented by a ZigBee module, a Bluetooth module or a WiFi module. ZigBee, also known as "ZiFeng", is a wireless network protocol with low speed and short distance transmission. The bottom layer is the media access layer and physical layer which adopt IEEE 802.15. 4 standard specification. Wi-Fi, also known as "Action Hotspot" in Chinese, is a brand certification that trademark of Wi-Fi Alliance manufacturers as products, and is a wireless LAN technology created in IEEE 802.11 standard.

In certain embodiments, in the present application, cooperation requests are broadcast so that the cooperation request propagates within the communication range of the requesting device. When other requesting devices receive a cooperation request, other requesting devices respond to the cooperation request, for example, responding to the corresponding cooperation requests by ACK. ACK, i.e., acknowledge character, is a kind of transmission control character sent by a receiving station to a sending station in data communication. It indicates that the data which is sent has been confirmed to be received correctly. Or feed back any other characters, Both of them can realize that assisting the requesting device to confirm other requesting devices existing within its communication range, and regarding the device responding to the cooperation request as the cooperative device, and then establishing a near field wireless communication connection with the cooperative device to realize data interaction, so that the data interaction between devices can also be carried out without network.

The scheme provided by the embodiment of the scheme can be applied to any one of requesting devices. In the present application, other requesting devices that respond to a cooperation request may be requesting devices, and can also be other types of devices. For example, in a factory area, either the robot responsible for transportation or the robot responsible for assembly can be the requesting device or other requesting devices responding to the cooperation request of the requesting device in the present application. By confirming the devices in the communication range, and then wireless communication connection with the devices in the communication range is established, such that even if there is no network, each robot can interact with each other in data so as to complete tasks.

In certain embodiments, for example, for the logistics goods sorting robot that has been applied on a large scale. Every robot runs very fast. To avoid collision between robots, it is necessary for the system to calculate with high precision the running route and running time of the robots . Usually, it is necessary to distinguish the running priority of robots, so that some robots pass first to avoid collision. But this will lead to a waste of transportation time of robots with lower priority. By way of the method in the present application, in fact, the process of data acquisition is put on the device, where it is not necessary for transmitting by the server being a intermediary, so that the time of data transmission is reduced. At the same time, devices can obtain each other's data in real time. This can greatly avoid the collision between robots. For example, by obtaining the location information of adjacent devices in real time, to avoid collisions, it is only needed to set up an anti-collision program in the device, where the movement is stopped when the distance is less than the preset distance. At the same time, the present application can also make some off-line robots directly obtain the operation data of adjacent devices without accquiring the operation parameters of adjacent devices through the server, and realize the cooperative operation of multiple robots in an off-line environment.

Figure 2:
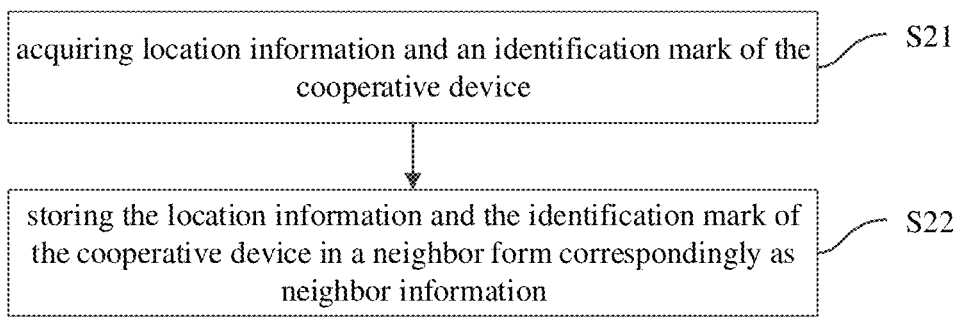
FIG. 2 is a schematic flowchart of a method for multi-device cooperation provided by another embodiment of the present disclosure.

As shown in FIG. 2, an embodiment of the present disclosure provides a method for multi-device cooperation. Referring to FIG. 2, the cooperation method further includes S21 and S22 compared with the cooperation method shown in FIG. 1.

S21, the location information and the identification mark of the cooperative device are acquired.

In certain embodiments, the data may be sent to the requesting device by the cooperative device with its own location information and identification mark in response to the cooperating request. The location information may be spatial coordinate information of the cooperative device at this time. It can also be relative location information relative to a fixed reference object. It can also be relative location information of the cooperative device relative to the requesting device, where the identification mark can be a device identification number of the device or a preset device number. The requesting device can determine the location of the cooperative device at this time through the location information, and the requesting device can determine the identity of the cooperative device through the identification mark.

S22, the location information and the identification mark of the cooperative device are stored in the neighbor form correspondingly as neighbor information.

In some embodiments, the location information of the cooperative device and the identification mark are combined as neighbor information, and the neighbor information is stored in a neighbor form to facilitate management of the cooperative device of the requesting device so that the requesting device can quickly perform data interaction with the cooperative device.

In some embodiments, by correspondingly storing the location information and the identification mark of the cooperative device, the requesting device can quickly determine the location and identity of the cooperative device to facilitate data interaction between the requesting device and the cooperative device.

Figure 3:
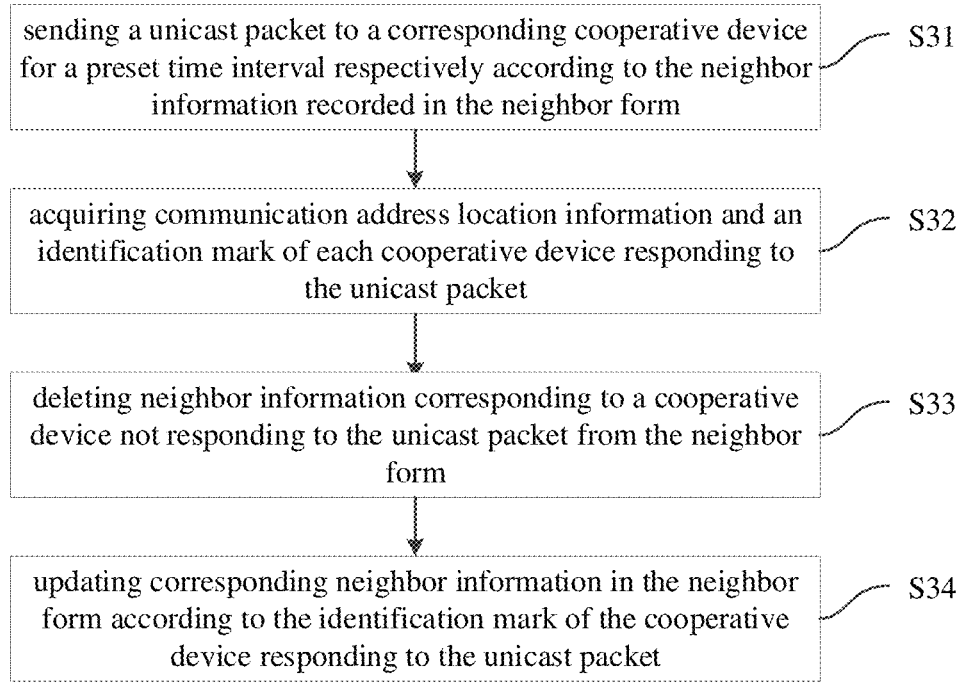
FIG. 3 is a first schematic flowchart of a method for multi-device cooperation provided by yet another embodiment of the present disclosure.

As shown in FIG. 3, in some embodiments, the cooperation method further includes S31 to S34.

S31, according to the neighbor information recorded in the neighbor form, the unicast packets are respectively sent to the corresponding cooperative device every preset time interval.

In certain embodiments, after determining the cooperative device, in order to maintain the relationship of data interaction between the cooperative device and the requesting device, unicast packets are respectively transmitted to the cooperative device every preset time interval according to the recorded neighbor information. Because the neighbor information is known, the consumption of unicast packets is lower and faster than sending data packets to other devices in the form of broadcasting.

S32, the location information and the identification mark of each cooperative device responding to the unicast packet is acquired.

In certain embodiments, after the unicast packet is sent to the cooperative device, if the cooperative device responds to the unicast packet, it means that the cooperative device is still in the data communication range of the requesting device, where the response mode is the same as the response mode in the cooperation method shown in FIG. 1, and the mode of acquiring the obtained location information and the identification mark is the same as that in the above method, which is not described in detail in this step.

S33, the neighbor information corresponding to the cooperative device that does not respond to the unicast packet is deleted from the neighbor form.

In some embodiments, if the cooperative device does not respond to the unicast packet, the cooperative device may have moved out of the range of activity of the requesting device. At this time, the corresponding neighbor information of the cooperative device is deleted from the neighbor information form to complete the information update for the cooperative device.

S34, in the neighbor form, the corresponding neighbor information is updated according to the identification mark of the cooperative device responding to the unicast packet.

In some implementations, if the cooperative device responds to the unicast packet, it means that the cooperative device is still in the communication range of the requesting device. At this time, the location information of the cooperative device is updated in real time, and at the same time, it is convenient for the requesting device to communicate with the cooperative device next time.

In the whole multi-machine interaction process, for the robot passively receiving data is taken as the main means, actively inquiring information is taken as the auxiliary means. When the near-field communication device scans the peripheral data, it actively reports it to the robot body, and continuously scans the device until the device disconnects from the network.

In some embodiments, in the process of updating the neighbor information in the neighbor form, the update time of the neighbor information may also be recorded.

Figure 4:
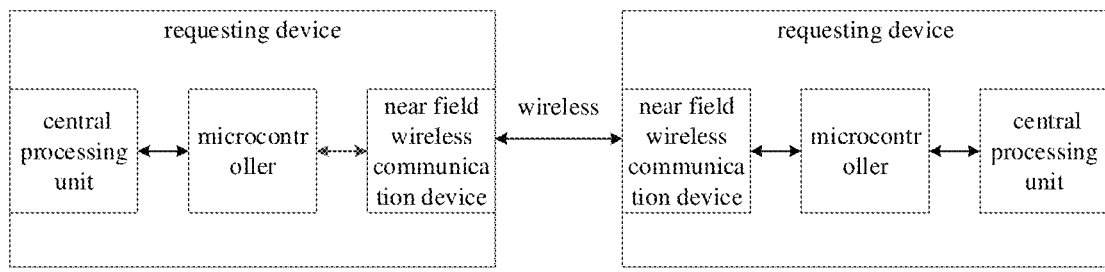
FIG. 4 is a schematic structural diagram of a requesting device provided by yet another embodiment of the present disclosure.

As shown in FIG. 4, in some embodiments, the requesting devices each includes a central processing unit, a microcontroller and a near field wireless communication device; The central processing unit and the microcontroller are connected through the controller local area network bus; The microcontroller is connected with the near field near field wireless communication device.

Figure 5:
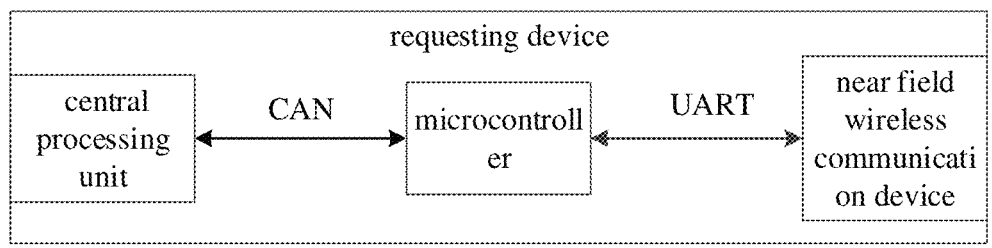
FIG. 5 is a schematic structural diagram of a requesting device provided by yet another embodiment of the present disclosure.

As shown in FIG. 5, in some embodiments, the central processing unit and the microcontroller are connected via a CAN bus, and the microcontroller and the near field wireless communication device are connected via a UART bus to realize the connection from the central processing unit to the near field wireless communication device. CAN is the abbreviation of Controller Area Network. Field bus is a new technology developed in recent 20 years. CAN bus is a widely used field bus, which has a great application prospect in the fields of industrial measurement and control and industrial automation. Universal Asynchronous Receiver/Transmitter is commonly known as UART. It converts the data to be transmitted between serial communication and parallel communication. As a chip for converting parallel input signals into serial output signals, UART is usually integrated into the connection of other communication interfaces.

In some embodiments, the requesting device is wirelessly connected to a near near field wireless communication device of the cooperative device.

Figure 6:
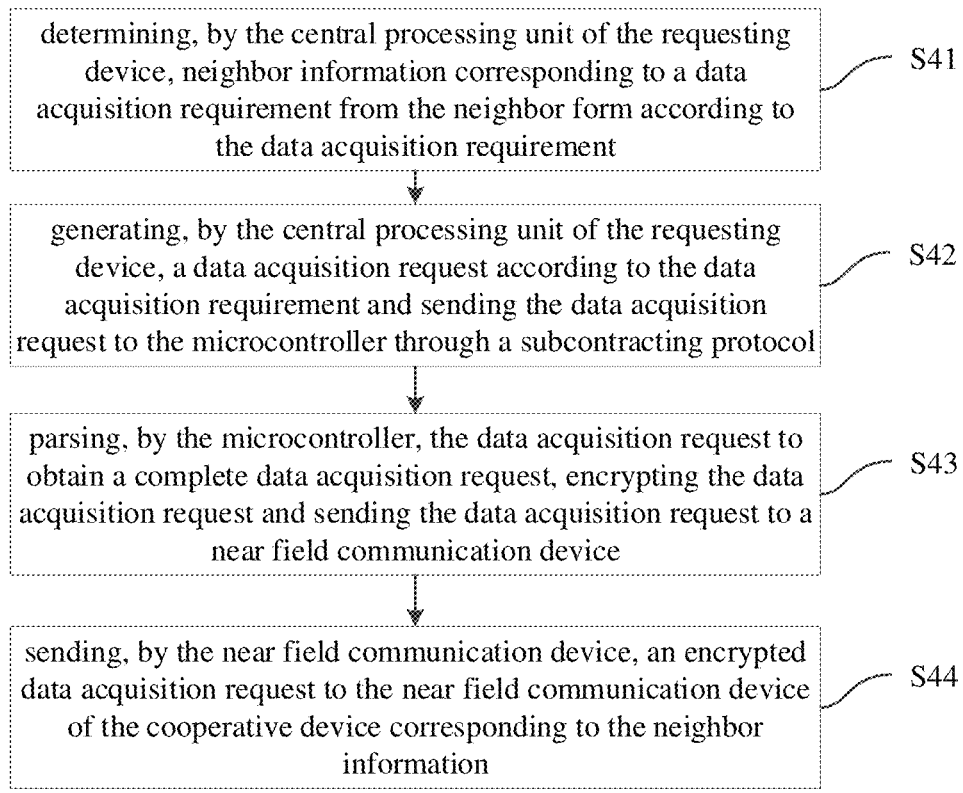
FIG. 6 is a second schematic flowchart of a method for multi-device cooperation provided by yet another embodiment of the present disclosure.
Figure 7:
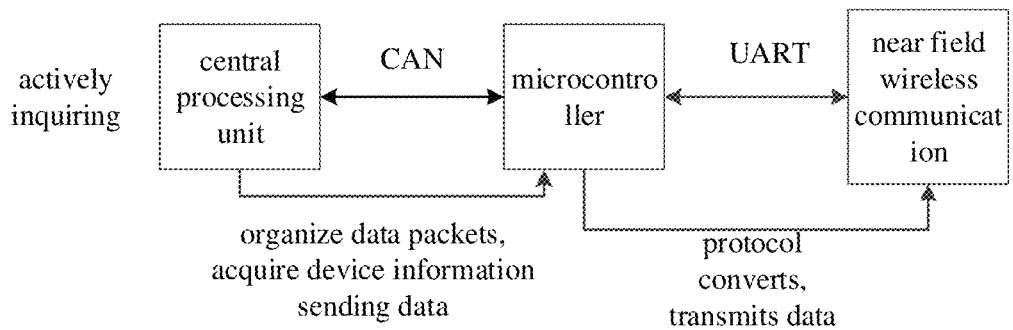
FIG. 7 is a schematic diagram of data interaction in which a requesting device actively acquires other requesting devices provided by yet another embodiment of the present disclosure.

As shown in FIGS. 6 and 7, in some embodiments, data interaction with a cooperative device is performed based on near-field radio communication, including S41 to S44, in conjunction with the cooperation method as shown in FIGS. 1 and 2.

S41, the central processing unit of the requesting device determines the neighbor information corresponding to a data acquisition requirement from the neighbor form according to the data acquisition requirement.

In some implementations, a cooperative device that can provide corresponding data is determined according to data acquisition requirements, and corresponding neighbor information is determined from a neighbor form. When the requesting device body wants to obtain certain data immediately, it can actively organize data packets and query certain data from the corresponding cooperative device.

S42, the central processing unit of the requesting device generates a data acquisition request according to the data acquisition requirement, and sends the data acquisition request to the microcontroller through the subcontracting protocol.

In some embodiments, a data acquisition request is generated according to the data acquisition requirements. The data acquisition request is sent to the microcontroller through the subcontracting protocol. Since the amount of data of single packet of CAN data packet is too small to transmit slightly longer data, the subcontracting protocol is made in the CAN transport layer. The microcontroller is responsible for parsing and converting it into an effective wireless transmission data packet and sending it to the near field wireless communication device.

S43, the microcontroller passes the data acquisition request to obtain a complete data acquisition request, and encrypts the data acquisition request and sends it to the near field wireless communication device.

In some implementations, after the complete data acquisition request is parsed by the microcontroller, the data acquisition request is encrypted and forwarded to the near field wireless communication device, and the data theft is avoided by encrypting the data acquisition request.

S44, the near field wireless communication device transmits the encrypted data acquisition request to the near field wireless communication device of the cooperative device corresponding to the neighbor information.

In some embodiments, the encrypted data acquisition request is sent by the near field wireless communication device to the near field wireless communication device of the corresponding cooperative device.

In certain embodiments, after the data acquisition request is sent to the near field wireless communication device of the cooperative device, the near field wireless communication device of the cooperative device sends the data acquisition request to the microcontroller, and the microcontroller sends the data acquisition request to the central processing unit. According to the data acquisition request, the cooperative device feeds back the corresponding data to the central processing unit of the requesting device according to the original path, thus completing the closed loop of the data acquisition process.

Figure 8:
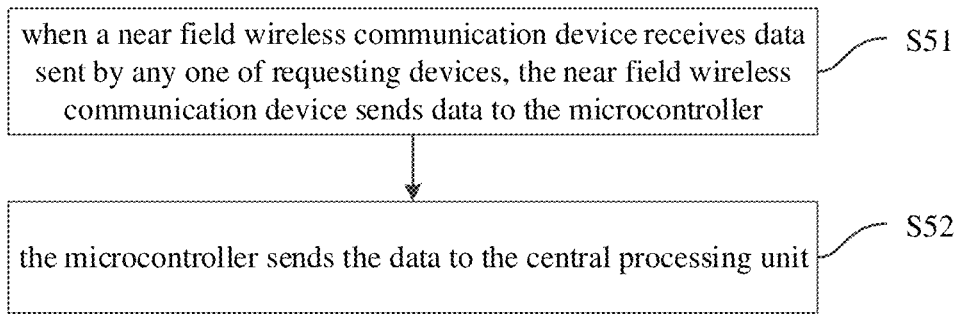
FIG. 8 is a third schematic flowchart of a method for multi-device cooperation provided by yet another embodiment of the present disclosure.
Figure 9:
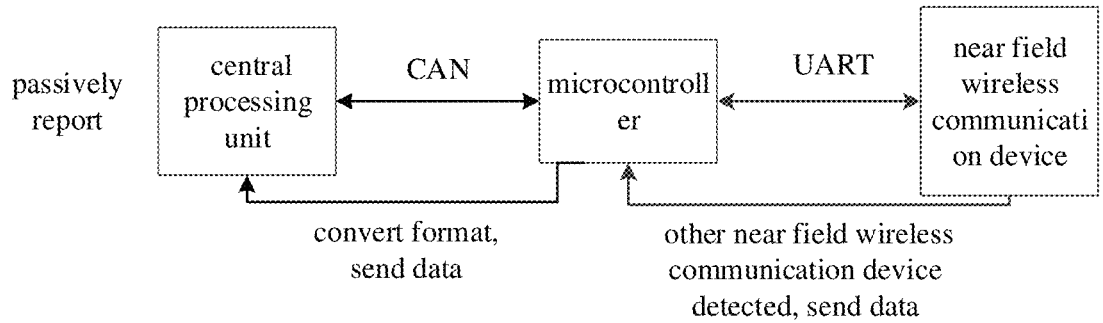
FIG. 9 is a schematic diagram of data interaction in which a near field wireless communication device passively reports data to a central processing unit according to another embodiment of the present disclosure.

As shown in FIGS. 8 and 9, in some embodiments, the cooperation method further includes S51 and S52.

S51, when the near field wireless communication device receives the data sent by any request device, the near field wireless communication device sends the data to the microcontroller.

In some embodiments, when a near field wireless communication device of a requesting device receives data sent by any one of requesting devices, the data is fed back to the microcontroller.

S52, the microcontroller sends the data to the central processing unit.

In some embodiments, data is sent by the microcontroller to the central processing unit, so as to control the requesting device to operate based on the data.

Figure 10:
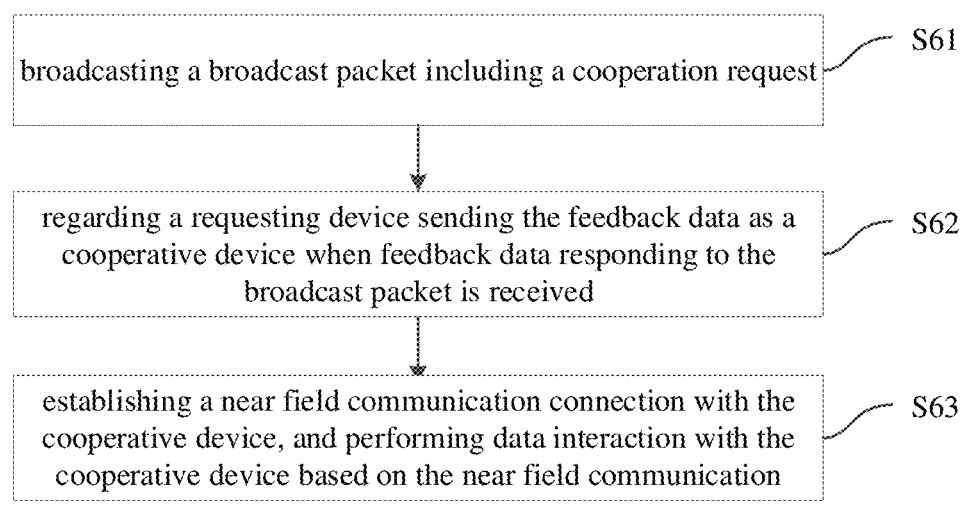
FIG. 10 is a fourth schematic flowchart of a method for multi-device cooperation provided by yet another embodiment of the present disclosure.

As shown in FIG. 10, an embodiment of the present disclosure provides a method for multi-device cooperation. Referring to FIG. 6, the cooperation method includes S61 to S63.

S61, broadcasting a broadcast packet containing a cooperation request, where the cooperation request includes: location information and identification mark of the requesting device.

In some embodiments, a broadcast packet containing a cooperation request is transmitted in a broadcast manner. Location information and identification mark of a requesting device are configured in the broadcast packet so that the requesting device receiving the broadcast packet can obtain the location and device number of the requesting device transmitting the broadcast packet, so that the requesting device receiving the broadcast packet can perform data feedback.

S62, when the feedback data responding to the broadcast packet is received, the requesting device that sends the feedback data is used as the cooperative device; where the feedback data includes: location information and identification mark of the requesting device, and location information and identification marks of other requesting device that sends the feedback data.

In some embodiments, when feedback data responding to a broadcast packet is received, a requesting device transmitting the feedback data is regarded as a cooperative device, where the feedback data is regarded as feedback data responding to the broadcast packet only when the location information and the identification mark of the requesting device are included in the feedback data.

S63, a near field wireless communication connection with the cooperative device is established, and data interaction with the cooperative device based on the near field wireless communication is performed.

For step S63, the description in step S13 can be referred to in detail and will not be repeated here.

Figure 11:
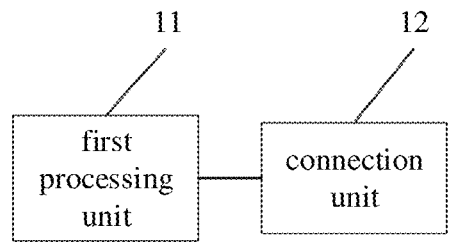
FIG. 11 is a schematic structural diagram of an apparatus for multi-device cooperation provided by yet another embodiment of the present disclosure.

As shown in FIG. 11, an embodiment of the present disclosure provides a multi-device cooperative device including at least two requesting devices, each of the requesting devices includes a first processing unit 11 and a connection unit 12.

In some embodiments, the first processing unit 11 is configured to broadcast the cooperation request.

In some embodiments, the first processing unit 11 is further configured to determine other requesting devices responding to the cooperation request and to regard the other requesting devices responding to the cooperation request as the cooperative device.

In some embodiments, the connection unit 12 is configured to establish a near field wireless communication connection with the cooperative device and to interact with the cooperative device for data based on the near field wireless communication.

In some embodiments, the requesting device further includes a second processing unit configured to obtain location information and identification mark of the cooperative device; and the location information and the identification mark of the cooperative device are correspondingly stored in the neighbor form as neighbor information.

In some embodiments, the requesting device further includes: a third processing unit, configured to send unicast packets to a corresponding cooperative device according to the neighbor information recorded in the neighbor form every preset time interval; to acquire location information and identification marks of each cooperative device responding to the unicast packet; and to delete the neighbor information corresponding to the cooperative device that does not respond to the unicast packet from the neighbor form; to update, in the neighbor form, the corresponding neighbor information according to the identification mark of the cooperative device responding to the unicast packet.

In some embodiments, the requesting device each includes a central processing unit, a microcontroller, and a near field wireless communication device; the central processing unit includes a first processing unit and a second processing unit; the near field wireless communication device includes: a connection unit; the central processing unit includes the first processing unit 11 and the second processing unit, and the microcontroller is used as a relay device to forward the processing instruction from the central processing unit to the near field wireless communication device, and the connection unit 12 is the near field wireless communication device in this embodiment.

In some embodiments, the central processing unit and the microcontroller are connected via a controller local area network bus; the microcontroller is connected with the near field wireless communication device.

In some embodiments, the near field wireless communication device of the requesting device is wirelessly connected to the near field wireless communication device of the cooperative device.

In some embodiments, the central processing unit of the requesting device determines neighbor information corresponding to the data acquisition requirement from the neighbor form according to the data acquisition requirement; the central processing unit of the requesting device generates a data acquisition request according to the data acquisition requirement and sends the data acquisition request to the microcontroller through a subcontracting protocol; the microcontroller passes the data acquisition request to obtain a complete data acquisition request, encrypts the data acquisition request and sends it to the near field wireless communication device; the near field wireless communication device sends the encrypted data acquisition request to the near field wireless communication device of the cooperative device corresponding to the neighbor information.

In some embodiments, when the near field wireless communication device receives data sent by any one of requesting devices, the near field wireless communication device sends the data to the microcontroller; the microcontroller sends the data to the central processing unit; any one of requesting devices includes other requesting devices or cooperative devices.

In some embodiments the first processing unit 11 is configured to broadcast a broadcast packet containing a cooperation request, where the cooperation request includes: location information and an identification of the requesting device.

In some embodiments the first processing unit 11 is configured to regard the requesting device that sends the feedback data as a cooperative device when receiving the feedback data in response to the broadcast packet; the feedback data includes: location information and identification marks of the requesting device, and the location information and the identification marks of other requesting devices that send the feedback data.

Figure 12:
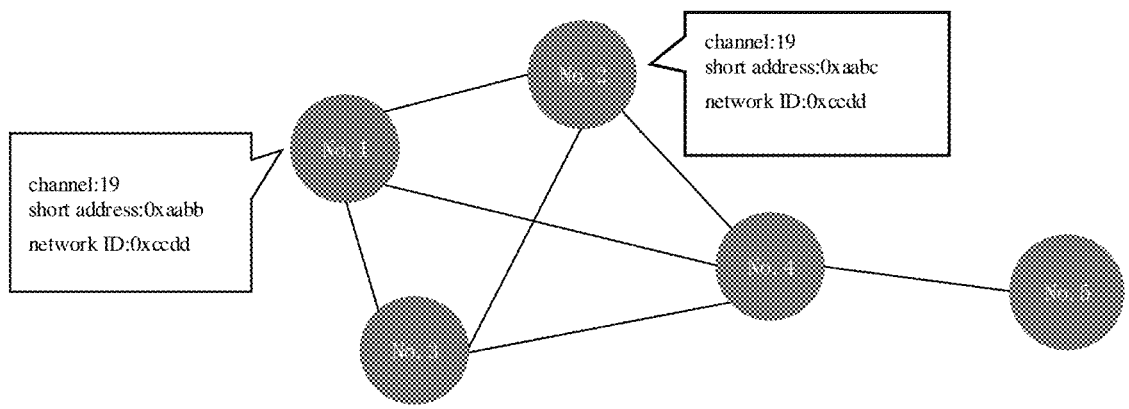
FIG. 12 is a connection diagram of a near field wireless communication device of each device of a system for multi-device cooperation provided by yet another embodiment of the present disclosure.

As shown in FIG. 12, an embodiment of the present disclosure provides a connection diagram of a near field wireless communication device of each device of a system for multi-device cooperative. Referring to FIG. 1, wireless connection devices 1 to 5 can adopt ZigBee technology and MESH ad hoc network. The devices have the same channel and PAN ID. Different wireless connection devices have different short addresses, so they can establish connections within a limited distance of a device and send data to each other. Mesh network, i.e., "wireless mesh network", is a "multi-hop" network, which is developed from ad hoc network, and is one of the key technologies to solve the "last mile" problem. The PAN ID is a domain network address. The occurrence is generally accompanied by the determination of the channel. The full name of PAN ID is Personal Area Network ID, which means the ID (i.e., the network identifier) of the network.

In some embodiments, data packets are broadcast, the broadcast data packets are generated by the central processing unit or pre-cached at the near field wireless communication device, the near field wireless communication device actively snoops peripheral devices, sending and receiving data are in an asynchronous manner, and peripheral neighbor information is cached when snoops are answered; in some embodiments, for example, Device No. 1 sends: 7E 12 FF FF XX XX * 7F, where FF FF is a broadcast address; Device No. 2 receives: 7E 12 BB AA XX XX * 7F, where BB AA is the short address of Device No. 1. After the data is parsed, Device No. 2 sends: 7E 12 BB AA XX XX * 7F, where BB AA is the short address of Device No. 1; Device No. 1 received: 7E 12 BC AA XX XX * 7F, where BC AA is the short address of Device No. 2. After the data is parsed, the short address of Device No. 2 was cached in the neighbor form, and the neighbor is successfully scanned. Similarly, all the peripheral devices around Device No. 1 will be successfully scanned by Device No. 1 and cached to the neighbor form.

Figure 13:
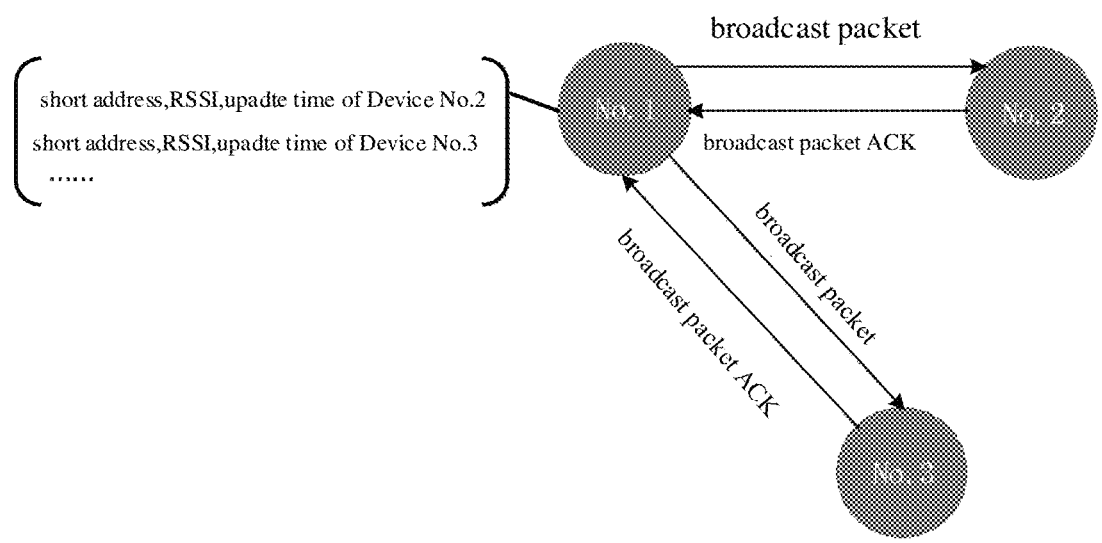
FIG. 13 is a first schematic diagram of data interaction of the near field wireless communication devices of each device of the system for multi-device cooperation provided by yet another embodiment of the present disclosure.
Figure 14:
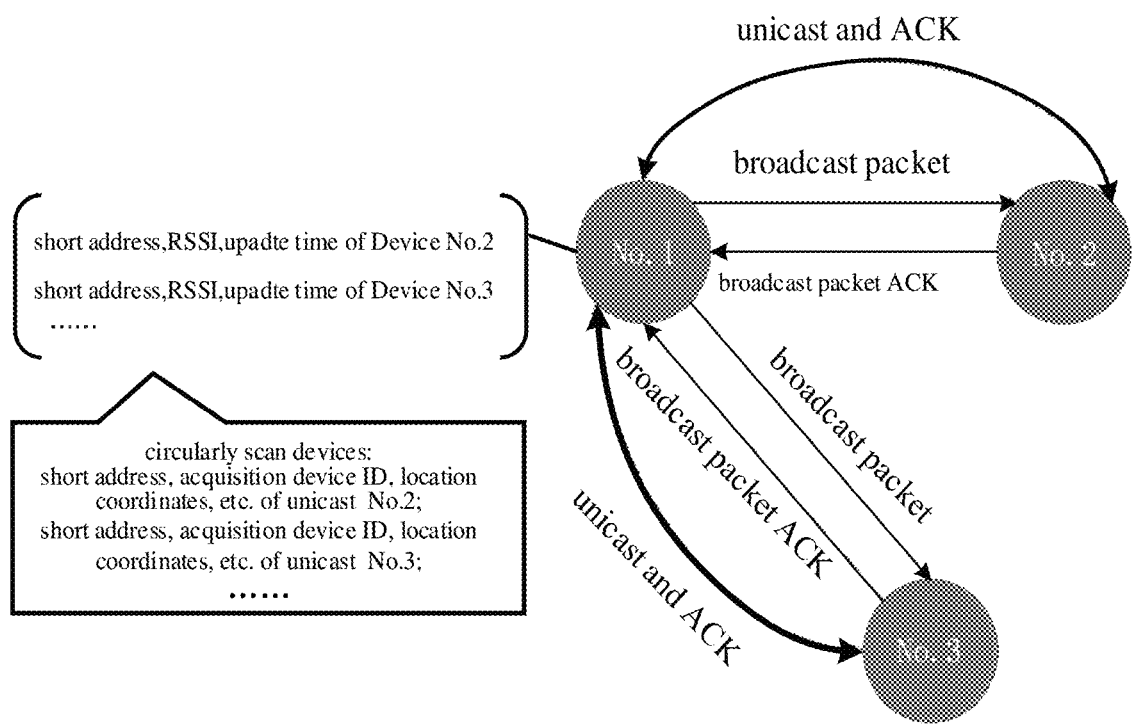
FIG. 14 is a second schematic diagram of data interaction of the near field wireless communication devices of each device of the system for multi-device cooperation provided by yet another embodiment of the present disclosure.

As shown in FIG. 13 and FIG. 14, an embodiment of the present disclosure provides an information interaction diagram between near field wireless communication devices of each device of a multi-device cooperation system; Referring to FIGS. 9 and 10, after the peripheral devices are confirmed and the neighbor form is established, unicast network packets are started so as to reduce the pressure of broadcast data on the network, and peripheral devices added to the neighbor form are scanned at a faster frequency to reduce data errors caused by caching. In the interaction process of each unicast packet, short address of devices, RSSI and update time of the data packet are all recorded.

Figure 15:
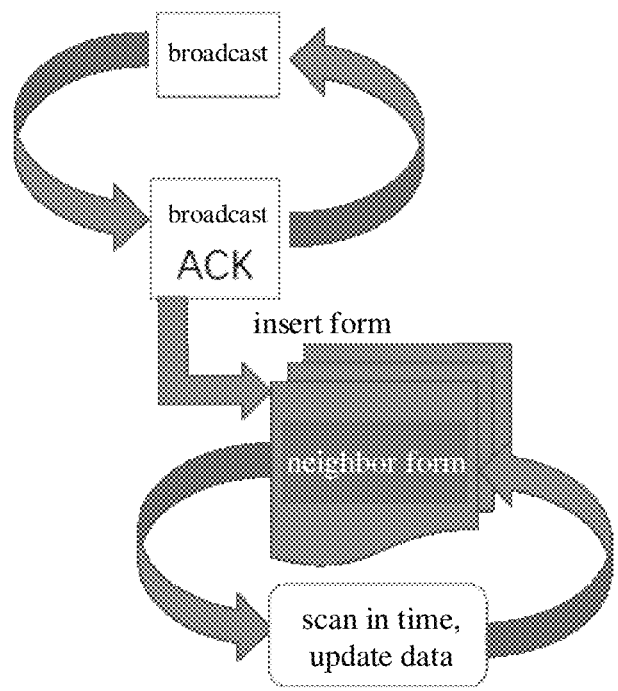
FIG. 15 is a schematic diagram of data updating of a neighbor form provided by yet another embodiment of the present disclosure.

As shown in FIG. 15, a schematic diagram of maintaining neighbor form in multi-device cooperation process is provided. In some implementations, from the initial broadcast data packet to the determination of neighbor form, the reply information of the data packet scanned by unicast packet is maintained in a data table, which is scanned and updated regularly, and the device disconnected from the network due to the device's movement is deleted in time to ensure the timeliness of data.

Figure 16:
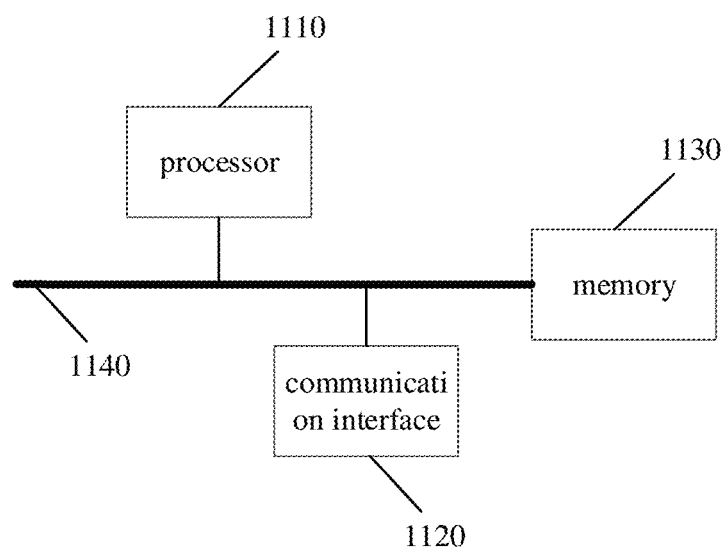
FIG. 16 is a schematic structural diagram of the system for multi-device cooperation provided by yet another embodiment of the present disclosure.

As shown in FIG. 16, an embodiment of the present disclosure provides a system for multi-device cooperation, including at least two requesting devices, each of which includes a processor 1110, a communication interface 1120, a memory 1130 and a communication bus 1140, where the processor 1110, the communication interface 1120 and the memory 1130 communicate with each other through the communication bus 1140;

The memory 1130 is configured to store computer programs; and

The processor 1110 is configured to execute programs stored on the memory 1130.

In the electronic device provided by the embodiment of the present disclosure, the processor 1110 executes a program stored on memory 1130 by broadcasting a cooperation request, so that the cooperation request propagates within the communication range of the requesting device. When other requesting devices receive the cooperation request, the other requesting devices respond according to the cooperation request and the device responding to the cooperation request is regarded as the cooperative device, and then a near field wireless communication connection with the cooperative device is established to realize data interaction, so that data interaction between devices can be carried out without network.

The communication bus 1140 mentioned in the above-mentioned electronic device may be a Peripheral Component Interconnect (PCI) bus or an Extended Industry Standard Architecture (EISA) bus or the like. The communication bus 1140 may be divided into an address bus, a data bus, a control bus and the like. For ease of presentation, only one thick line is used in the figure, but it does not mean that there is only one bus or one type of bus.

The communication interface 1120 is used for communication between the electronic device and other requesting devices.

The memory 1130 may include a Random Access Memory (RAM) or a non-volatile memory such as at least one disk memory. Alternatively, memory 1130 may also be at least one storage device located remotely from processor 1110.

The processor 1110 may be a general-purpose processor, including a Central Processing Unit (CPU), a Network Processor (NP), and the like; it can also be Digital Signal Processor (DSP), Application Specific Integrated Circuit (ASIC), Field-Programmable Gate Array (FPGA) or other programmable logic devices, discrete gates or transistor logic devices, and discrete hardware components.

An embodiment of the present disclosure provides a computer-readable storage medium. One or more programs are stored on the computer-readable storage medium. One or more programs can be executed by one or more processors to implement the method according to any of the above embodiments for activation of a device-side and platform-side session.

In the above-described embodiments, it may be implemented in whole or in part by software hardware firmware or any combination thereof. When implemented in software, it can be implemented in whole or in part in the form of a computer program product. A computer program product includes one or more computer instructions. When computer program instructions are loaded and executed on a computer, the flow or function according to embodiments of the present disclosure is generated in whole or in part. The computer may be a general purpose computer, a special purpose computer, a computer network, or other programmable device. The computer instructions may be stored in a computer-readable storage medium, Or from one computer-readable storage medium to another, For example, computer instructions may be transmitted from one Web site, computer, server, or data center to another Web site, computer, server, or data center via wired (e.g. coaxial cable, optical fiber, digital subscriber line (DSL)) or wireless (e.g. infrared, wireless, microwave, etc.). A computer-readable storage medium may be any available medium that a computer can access or a data storage device such as a server, data center, etc. containing one or more available media integration. Available media may be magnetic media (e.g. floppy disk, hard disk, magnetic tape), optical media (e.g. DVD), or semiconductor media (e.g. Solid State Disk (SSD)), etc.

Finally, it should be noted that the above embodiments are only used to illustrate the technical scheme of the present disclosure, but not to limit it; Although the present disclosure has been described in detail with reference to the foregoing embodiments, it should be understood by those of ordinary skill in the art that the technical scheme described in the foregoing embodiments can still be modified or some technical features thereof can be equivalently replaced; These modifications or substitutions do not depart from the spirit and scope of the respective embodiments of the present disclosure.

The invention claimed is:

1. A method for multi-device cooperation, applied to any one of requesting devices, the method comprising:
broadcasting a cooperation request;
determining other requesting devices responding to the cooperation request and regarding the other requesting devices responding to the cooperation request as cooperative devices; and
establishing a near field wireless communication connection with the cooperative device, and performing data interaction with the cooperative device based on the near field wireless communication;
wherein the method further comprises:
acquiring location information and an identification mark of the cooperative device; and
storing the location information and the identification mark of the cooperative device in a neighbor form correspondingly as neighbor information;
wherein each of the requesting devices comprises: a central processing unit, a microcontroller and a near field wireless communication device; the central processing unit is connected with the microcontroller through a controller local area network bus; the microcontroller is connected with the near field wireless communication device;
wherein, establishing the near field wireless communication connection with the cooperative device comprises:
wirelessly connecting the near field wireless communication device of the requesting device with the near field wireless communication device of the cooperative device.

2. The method for multi-device cooperation according to claim 1, further comprising:
sending a unicast packet to a corresponding cooperative device for a preset time interval respectively according to the neighbor information recorded in the neighbor form, sending the unicast packet respectively to the corresponding cooperative device according to the neighbor information recorded in the neighbor form;
acquiring communication address location information and an identification mark of each cooperative device responding to the unicast packet;
deleting neighbor information corresponding to a cooperative device not responding to the unicast packet from the neighbor form; and
updating corresponding neighbor information in the neighbor form according to the identification mark of the cooperative device responding to the unicast packet.

3. The method for multi-device cooperation according to claim 1, wherein performing the data interaction with the cooperative device based on the near field wireless communication comprises:

determining, by the central processing unit of the requesting device, neighbor information corresponding to a data acquisition requirement from the neighbor form according to the data acquisition requirement;
generating, by the central processing unit of the requesting device, a data acquisition request according to the data acquisition requirement and sending the data acquisition request to the microcontroller through a subcontracting protocol;
parsing, by the microcontroller, the data acquisition request to obtain a complete data acquisition request, encrypting the data acquisition request and sending the data acquisition request to the near field wireless communication device; and
sending, by the near field wireless communication device, an encrypted data acquisition request to the near field wireless communication device of the cooperative device corresponding to the neighbor information.

4. The method for multi-device cooperation according to claim 1, further comprising:
sending, by the near field wireless communication device, the data to the microcontroller, when the near field wireless communication device receives the data sent by any one of requesting devices; the any one of the requesting devices comprises: other requesting devices or cooperative devices; and
sending, by the microcontroller, the data to the central processing unit.

5. The method for multi-device cooperation according to claim 1, wherein broadcasting the cooperation request; determining other requesting devices responding to the cooperation request and regarding the other requesting devices responding to the cooperation request as cooperative devices, comprises:
broadcasting a broadcast packet containing a cooperation request, wherein the cooperation request comprises: location information and identification mark of the requesting device; and
regarding a requesting device sending the feedback data as a cooperative device when feedback data responding to the broadcast packet is received; wherein, the feedback data comprises: location information and identification mark of the requesting device, and location information and identification mark of other requesting devices sending the feedback data.

6. An apparatus for multi-device cooperation comprising at least two requesting devices, wherein each of the requesting devices comprises:
a first processing unit, configured for broadcasting a cooperation request; wherein, the first processing unit is further configured for determining other requesting devices responding to the cooperation request and regarding the other requesting devices responding to the cooperation request as cooperative devices;
a connection unit, configured for establishing a near field wireless communication connection with the cooperative device and performing data interaction with the cooperative device based on the near field wireless communication; and
a second processing unit, configured for acquiring the location information and the identification mark of the cooperative device; and storing the location information and the identification mark of the cooperative device in a neighbor form as neighbor information;
wherein each of the requesting devices comprises: a central processing unit, a microcontroller and a near field wireless communication device; the central processing unit comprises: the first processing unit and the second processing unit; the near field wireless communication device comprises: the connection unit;

the central processing unit is connected with the microcontroller through a controller local area network bus; the microcontroller is connected with near field wireless communication device; and the near field wireless communication device of the requesting device is wirelessly connected with the near field wireless communication device of the cooperative device.

7. The apparatus for multi-device cooperation according to claim 6, wherein the requesting device further comprises:

a third processing unit, configured for sending a unicast packet to a corresponding cooperative device every preset time interval respectively according to the neighbor information recorded in the neighbor form, sending the unicast packet respectively to the corresponding cooperative device according to the neighbor information recorded in the neighbor form; acquiring communication address location information and the identification mark of each cooperative device responding to the unicast packet; deleting neighbor information corresponding to a cooperative device not responding to the unicast packet from the neighbor form; and updating corresponding neighbor information in the neighbor form according to the identification mark of the cooperative device responding to the unicast packet.

8. The apparatus for multi-device cooperation according to claim 6, wherein, the central processing unit of the requesting device is configured for determining neighbor information corresponding to a data acquisition requirement from the neighbor form according to the data acquisition requirement;

the central processing unit of the requesting device is further configured for generating a data acquisition request according to the data acquisition requirement and sending the data acquisition request to the microcontroller through a subcontracting protocol;

the microcontroller is configured for parsing the data acquisition request to obtain a complete data acquisition request, encrypting the data acquisition request and sending the data acquisition request to a near field wireless communication device; and the near field wireless communication device is configured for sending an encrypted data acquisition request to the near field wireless communication device of the cooperative device corresponding to the neighbor information.

9. The apparatus for multi-device cooperation according to claim 6, wherein, the near field wireless communication device is further configured for sending the data to the microcontroller, when the near field wireless communication device receives the data sent by any one of requesting devices; the any one of requesting devices comprises: other requesting devices or cooperative devices; and the microcontroller is further configured for sending the data sent by the near field wireless communication device to the central processing unit.

10. The apparatus for multi-device cooperation according to claim 6, wherein, the first processing unit is configured for broadcasting a broadcast packet containing a cooperation request, wherein the cooperation request comprises: the location information and the identification mark of the requesting device; and the first processing unit is configured for regarding a requesting device sending the feedback data as a cooperative device when feedback data responding to the broadcast packet is received; wherein, the feedback data comprises: the location information and the identification mark of the requesting device, and the location information and the identification mark of other requesting devices sending the feedback data.

11. A system for multi-device cooperation, comprising at least two requesting devices, each of the requesting devices comprising a processor, a communication interface, a memory and a communication bus, wherein the processor, the communication interface and the memory communicate with each other through the communication bus;

the memory is configured for storing computer programs; and the processor is configured for implementing the method for multi-device cooperation according to claim 1 when executing the computer program stored on the memory.

12. A non-transitory computer-readable storage medium, on which one or more programs are stored, wherein the one or more programs, when executed by one or more processors, implement the method for multi-device cooperation according to claim 1.

* * * * *